Patented July 24, 1951

2,561,796

UNITED STATES PATENT OFFICE 2,561,796

OLEFIN-HALOAROMATIC COPOLYMER AND PREPARATION THEREOF

William C. Hollyday, Jr., Roselle, and William J. Sparks, Westfield, N. J., assignors to Standard Oil Development Company, a corporation of Delaware No Drawing. Application November 9, 1946, Serial No. 708,946

14 Claims. (Cl. 260—87.5)

This invention relates to novel organic copolymers, more particularly copolymers of a lower aliphatic olefin, and a polymerizable mono-olefinic haloaromatic hydrocarbon, and preparation thereof by low temperature Friedel-Crafts technique. The invention may be illustrated by a copolymer of isobutylene and parabromo styrene.

It has been known for some time, for instance as disclosed in U. S. Patent 2,130,507, that isobutylene can be polymerized at low temperatures, e. g. from −10° C. to −150° C. or so by means of a Friedel-Crafts catalyst such as boron fluoride or aluminum chloride, to high molecular weight linear type polymers having average molecular weights ranging from about 1,000 to 400,000 or more, the higher ones of which are substantially dry, non-tacky and somewhat elastic solids, whereas the extremely lower ones are more in the nature of very viscous oils than solids, the intermediate ones being more or less tacky, plastic solids. These polymers have found great utility for various purposes, such as for use as viscosity index improvers in mineral lubricating oils, flexibilizer and tensile strength improver for paraffin wax, waterproof and chemically resistant adhesive, etc. However, for some purposes, these polymers are too soft and tacky and have too much cold flow.

It has also been disclosed, as in Patent 2,274,749, that isobutylene and other lower aliphatic olefins can be copolymerized by the same type of low temperature Friedel-Crafts technique, with polymerizable mono-olefinic aromatic compounds such as styrene, indene, and the like, to produce thermoplastic solids and resins having relatively much harder texture than simple olefin polymers of a similar molecular weight. Some such copolymers are soluble in mineral oils and some are not, and many of them are soluble in fatty oils. Although some of these copolymers are very suitable for some thermoplastic uses, they are not completely satisfactory for purposes requiring relatively high heat-softening point and insolubility in various organic solvents.

It has now been found that substantial improvements over these two prior art types of products can be made by copolymerizing with the isobutylene or other lower aliphatic olefin a halogen-substituted, preferably ring-halogenated, polymerizable mono-olefinic aromatic compound. By thus using a controlled amount of halogen in the haloaromatic compound being copolymerized, and by using controlled proportions of aliphatic olefin and haloaromatic compound, novel copolymers can be produced having substantially any desired heat-softening point and solubility characteristics. Other advantages of this invention include avoiding the necessity of subsequent halogenation treatment to incorporate halogen in a copolymer made from halogen-free reactants, and avoiding molecular weight breakdown and halogenation in random positions as would result from such a subsequent halogenation instead of more uniformly controlled positions throughout the molecular structure of the polymer. Instead of isobutylene, other iso-olefins may be used such as isoamylene, particularly 2-methyl, 1-butene, isooctene, etc., as well as other aliphatic olefins such as ethylene, propylene, normal butylene, 1-octene, etc.

The preferred olefins are those having 3 to 5 carbon atoms. As the halogen-substituted polymerizable aromatic compound, one may use parachlorstyrene, parabromstyrene, parafluorstyrene, alpha-methyl parachlorstyrene, m-chlorstyrene, o-fluorstyrene, or other monohalogen-substituted styrenes, or mixed products containing an average of 1 halogen atom per molecule, but this halogen being in 2 or more positions around the aromatic nucleus. Also, dihalogen or polyhalogen-substituted styrene may be used, such as 2-5-dichlorstyrene, 2-5-dibromstyrene, 3-4-dichlorstyrene, or mixed products containing an average of 2 or more halogen atoms per molecule. Other halogen-substituted polymerizable aromatic compounds may also be used, such as chlorindene, chlorinated dihydronaphthylene, etc. Although such ring-halogenated compounds are preferred one may also use polymerizable mono-olefinic aromatic compounds containing halogen substituted in one or more aliphatic hydrocarbon radicals, as for instance, alphachlor styrene, alpha-chlorparachlorstyrene, etc., but these materials tend to lose chlorine and form low molecular weight cyclic polymers, and it is more difficult to obtain high molecular weight linear copolymers.

The proportions of copolymerization reactants to be used may be varied over a wide range, depending upon the proportion of combined halogen desired in the finished copolymer and upon the desired molecular weight, solubility and other characteristics desired in the resulting copolymer. The proportions and halogen content of the reactants also has an effect in determining the conditions of copolymerization, as will be explained more fully. Generally, however, the proportion of haloaromatic compound should be about 1–30% or 50% by weight if a monohalogen compound is used, and preferably about 5–20%, but should be somewhat lower such as 0.5–15% in the case of a dihaloaromatic compound, e. g. a dichlorstyrene, in this case the preferred proportions being about 2–10%, and even a smaller amount, e. g. about 0.3–10%, preferably about 1–5% in the case of a trihalogenated aromatic compound. A general guide for determining the amount of haloaromatic compound to be used is that the per cent haloaromatic compound times the number of halogen atoms in the molecule should equal about 1–30 or preferably about 5–20. The reason for this rule or guide is that the monohalogen aromatic compounds are more soluble in the reaction mixture and copolymerize more readily than the corresponding di-, tri-, or higher halogenated aromatic compounds. In the case of these di- or higher halogenated materials, it is often desirable to use as copolymerization feed, a ternary mixture containing the desired minor proportion of di- or higher halogenated aromatic compound, a major proportion of isobutylene or other lower olefins, and, as a mutual solvent and copolymerization assistant, a minor amount of an unhalogenated polymerizable mono-olefinic aromatic compound, such as styrene per se, alpha-methyl styrene, indene, dihydronaphthylene, etc. and/or corresponding monohaloaromatic compounds. In such a case, the proportion of these latter aromatic compounds should generally be about 1–5 parts by weight for each 1 part by weight of di- or higher halogenated aromatic compounds.

The copolymerization may be carried out under the general conditions described in U. S. Patent 2,274,749, but for the purposes of the present invention, the copolymerization should be carried out at temperatures below $-50°$ C., preferably below $-70°$ C., e. g. $-78°$ C., the temperature obtained when using solidified carbon dioxide as internal or external refrigerant, or $-103°$ C. as obtained when using liquefied ethylene as refrigerant, and the copolymerization should also be carried out in the presence of a lower alkyl halide solvent, such as methyl chloride or ethyl chloride, using about 1 to 5 liquid volumes of such solvent per liquid volume of reactant. In order to effect the copolymerization, one may use either aluminum chloride or boron fluoride or other Friedel-Crafts catalysts, e. g. $AlBr_3$, $TiCl_4$, etc. or various mixed catalysts, e. g. $AlBr_2Cl$, $AlCl_2Br$, etc., or various catalyst complexes such as $BF_3$-ether complex, etc. Some of these catalysts, such as $AlCl_3$, are advantageously used in the form of a solution thereof in a solvent such as a lower alkyl halide, e. g. methyl chloride, ethyl chloride, and the like, this solution preferably being made by dissolving the $AlCl_3$ in the solvent at the boiling point of the solvent or at room temperature or slightly elevated temperature, then cooling the resulting solution to or near the desired copolymerization temperature. A gaseous catalyst such as $BF_3$ may be used either in the gaseous state by bubbling it through the reaction liquid, or may be used as a solution which may be made by bubbling the $BF_3$ into a solvent such as methyl chloride or ethyl chloride and then cooling the solution to the desired copolymerization temperature.

If the copolymerization is carried out at only moderately low temperatures such as from $-10°$ C. to $-40°$ C. or so, it may not always be necessary to use any lower alkyl halide as solvent; in other words, one may use liquid propane as refrigerant and diluent or one may use liquid propane or butane or even a refined naphtha as diluent and use solid carbon dioxide as internal refrigerant in such quantities as required to maintain the desired temperature, or use a cold brine circulating through internal or external cooling coils for maintaining the desired temperature.

In carrying out the copolymerization reaction, various procedures may be used, for instance one of the simplest methods is to mix the two or more reactants and the inert solvent, and then add the catalyst. An alternative procedure is to feed the two or more reactants into a previously made solution or dispersion of the catalyst in a suitable inert solvent and/or refrigerant.

After the copolymerization reaction has been completed, which generally requires only a few minutes, residual catalyst is hydrolyzed and removed by adding to the reaction mixture a substantial amount, such as about 1 to 10 volumes, of a lower alcohol such as methyl or isopropyl alcohol, etc., or water or aqueous caustic soda, or mixtures thereof, per volume of reaction liquid, after which the product is then washed one or more times with water and completely separated from hydrolyzed catalyst, and finally the copolymer is separated from the solvent used during the reaction, this final separation being accomplished either by distillation or by precipitation if the polymer had not previously been precipitated during the catalyst hydrolysis step.

The resulting olefin-haloaromatic copolymer of this invention is generally a thermoplastic solid ranging from a slightly soft or plastic material having fair or even good solubility in many of the common organic solvents such as naphtha, heavy naphtha, benzene, toluene, xylene, carbon tetrachloride, etc. to relatively hard rigid solids of higher melting point and either insoluble or of low solubility in common organic solvents, or rubbery materials having indefinite softening temperatures. The average molecular weight of these copolymers will generally range from about 1,000 to 80,000 and preferably from about 5,000 to 50,000, depending chiefly upon the temperature of copolymerization and proportion of the reactants. The use of lowest temperatures generally gives the higher molecular weight products, but large proportions of haloaromatic reactant, and also high halogen content in the latter, tend to maintain lower molecular weights. These copolymers are substantially saturated and are chemically resistant.

The copolymers of this invention are especially well suited for many industrial uses, such as for preparing coating and impregnating compositions comprising such copolymer dissolved in a volatile solvent with or without other materials such as pigments, dyes, cellulosic lacquer materials, drying or semi-drying fatty oils, etc., or for preparing moulded, extruded, sheeted, or otherwise mechanically shaped products, laminated sheet materials, e. g. when used for bonding paper, cloth, wood, metal foil, regenerated cellulose, etc. or for fireproof roofing materials, electrical insulation, or for hot-melt coating and impregnating of fibrous materials, such as paper, cloth, etc.

It may also be compounded with natural or synthetic rubber, various natural and synthetic resins and polymers such as rosin, polystyrene, polybutene, styrene-isobutylene copolymers with or without fillers such as clay, wood flour, carbon black, silica, ground limestone, asbestos, aluminum powder, and cork.

The invention will be better understood from a consideration of the following experimental data:

Example 1

Parabromstyrene was made by treating parabromphenyl magnesium bromide with acetaldehyde, hydrolyzing, and then dehydrating the carbinol by distillation under reduced pressure from potassium bisulfate.

28 grams of parabromostyrene and 240 grams of isobutylene were diluted with 3 volumes of methyl chloride and the mixture was polymerized to 58% conversion at the boiling point of ethylene, i. e. at —103° C., using anhydrous aluminum chloride (dissolved in methyl chloride) as the catalyst. The copolymer was recovered by quenching the polymerization mixture in water, separating the polymer and kneading it in isopropyl alcohol, then drying the polymer by milling for 10 minutes at 250° F. roll temperature.

The resulting copolymer was found to have an average molecular weight of about 44,800, an intrinsic viscosity in toluene of about 1.45. Chemical analysis showed:

| | Per cent |
|---|---|
| Carbon | 80.80 |
| Hydrogen | 14.15 |
| Bromine | 4.04 |

This indicates that the copolymer contained about 9.25% by weight of combined parabromo styrene (the copolymerization reactants contained 10.4% by weight of parabromo styrene).

This copolymer was found to be soluble in naphtha, benzene, toluene and carbon tetrachloride, and insoluble in lower alcohols, acetone, and methyl ethyl ketone.

This product was found to be especially suitable for use as an extender for natural and synthetic rubber, as a constituent of cement for bonding rubber to metals, and as plasticizer for GR–I rubber and GR–A synthetic rubber mixtures.

Example 2

A mixture of 22 grams of parabromo styrene (which amounts to 8.4% by weight) and 240 grams of isobutylene, was polymerized to a 42% conversion under the same conditions as used in Example 1 except that boron trifluoride gas was used as catalyst, by bubbling the latter through the mixture of reactants and methyl chloride solvent. The resulting copolymer was recovered in the same manner as used in Example 1.

This product was found to have the following properties:

| | |
|---|---|
| Texture | Rubbery |
| Average molecular weight | 49,900 |
| Intrinsic viscosity | 1.61 |
| Specific gravity | 0.978 |
| Chemical analysis: | |
|     Carbon per cent | 82.32 |
|     Hydrogen do | 14.35 |
|     Bromine do | 3.15 |
| Soluble in: | |
|     Benzene | |
|     Toluene | |
|     Naphtha | |
| Insoluble in: | |
|     Lower alcohols | |
|     Acetone | |
|     Methyl ethyl ketone | |

Example 3

10 ml. of para-Cl styrene were added to 100 ml. of liquid isobutylene and the resulting mixture was diluted with 500 ml. of methyl chloride and cooled to —78° C. with 100 grams of solid $CO_2$. To this mixture was added 100 ml. of .08% $AlCl_3$–$CH_3Cl$ catalyst solution. The copolymer which formed as the catalyst was added, washed with water, and then air dried; it had a molecular weight of about 14,000.

Examples 4 to 6

A series of three experiments was made in which various indicated amounts of 2,5-dichlorostyrene and isobutylene were copolymerized at —78° C. using solid carbon dioxide as internal refrigerant, without any solvent or diluent and using gaseous $BF_3$ as catalyst. The 2,5-dichlorostyrene used was first purified by washing 5 times with a 5% NaOH solution. The amounts and proportions by weight used in these three tests were as follows:

| Example No. | 4 | | 5 | | 6 | |
|---|---|---|---|---|---|---|
| | g. | Per Cent | g. | Per Cent | g. | Per Cent |
| Isobutylene | 1,188 | 99 | 1,140 | 95 | 1,080 | 90 |
| 2,5-diCl styrene | 12 | 1 | 60 | 5 | 120 | 10 |

In all three of these tests copolymerization reaction occurred but was not as rapid and satisfactory as when methyl chloride is used as a solvent during the copolymerization. The resulting copolymers had the following physical properties.

| Test No. | Staudinger Mol. Weight [1] of Copolymer | Texture |
|---|---|---|
| 4 | 72,000 | Rubber-like solid. |
| 5 | 43,000 | Plastic rubber-like solid. |
| 6 | 39,000 | Very plastic rubber-like solid. |

[1] Approximate.

Example 7

A mixture of 25% by weight of parachlorstyrene and 75% by weight of isobutylene was copolymerized at —103° C. in 3 volumes of methyl chloride.

The resulting copolymer which had an average molecular weight of about 35,000 was used as a plasticizer for GR–A type of synthetic rubber which had been made by emulsion polymerization of a mixture of butadiene containing about 26% by weight of acrylonitrile. The synthetic rubber was compounded with the following materials with and without 3 parts by weight of the chlorstyrene-isobutylene copolymer:

| | Parts by weight |
|---|---|
| GR–A rubber | 15 |
| Zinc oxide | 0.75 |
| Stearic acid | 0.15 |
| Altax [1] | 0.15 |
| Sulfur | 0.225 |
| Kosmobile 66 [2] | 7.5 |

[1] Benzothiazol disulfide (accelerator).
[2] A medium processing channel black.

The above batches (without and with the chlorstyrene-isobutylene copolymer resin) were cured for 60 minutes at 287° F. with the following results:

|  | Without resin | With resin |
|---|---|---|
| Tensile strength (#/sq. in.) | 4,808 | 2,324 |
| Modulus (# at 300% elongation) | 1,074 | 616 |
| Per cent elongation at break | 590 | 650 |
| Texture | (1) | (2) |

[1] Very slight tack.
[2] Some tack on raw stock before cure, but none after.

These tests indicate that this chlorostyrene-isobutylene copolymer resin is a good plasticizer for resilient and difficult-working oil-resistant synthetic rubber.

It should also be noted that the synthetic rubber with which the chlorstyrene-isobutylene copolymer had been compounded showed much better sunlight resistance than the corresponding batch without this resin.

It is not intended that this invention be limited to the specific examples which have been given merely for the sake of illustration but only by the appended claims.

We claim:

1. A product having an average molecular weight of at least 1000 and consisting of a solid oil-soluble polymerization product of a reaction mixture consisting of 70% to 99.7% of a lower aliphatic olefin having not more than 8 carbon atoms and 0.3% to 30% by weight of a polymerizable mono-olefinic ring-halogenated aromatic hydrocarbon, the arithmetic product of the per cent of haloaromatic compound times the number of halogen atoms in the molecule being equal to 1 to 30.

2. A synthetic thermoplastic solid oil-soluble resinous product having an average molecular weight of 5000 to 50,000 consisting of the copolymerization product of a reaction mixture consisting of 70 to 99% by weight of an aliphatic olefin having 3 to 5 carbon atoms and 1 to 30% by weight of a ring-halogenated styrene, the arithmetic produce of the per cent of the halostyrene times the number of halogen atoms in the halostyrene molecule being 1 to 30.

3. A synthetic thermoplastic solid oil-soluble resinous product having an average molecular weight of 5000 to 50,000, consisting of the copolymerization product of 70 to 99% by weight of isobutylene and 1 to 30% by weight of a parahalostyrene.

4. Copolymer according to claim 3 in which the parahalostyrene is parabromostyrene.

5. Copolymer according to claim 3 in which the parahalostyrene is parachlorstyrene.

6. A synthetic thermoplastic solid oil-soluble resinous product having an average molecular weight of 5000 to 50,000, consisting of the copolymerization product of 85 to 99.5% by weight of isobutylene and 0.5 to 15% by weight of 2,5-dichlorostyrene.

7. The process which comprises copolymerizing a mixture consisting of 70 to 99.7% of a lower aliphatic olefin having not more than 8 carbon atoms and 0.3 to 30% by weight of a polymerizable monoolefinic ring-halogenated aromatic hydrocarbon, the arithmetic product of the per cent of haloaromatic compound times the number of halogen atoms in the molecule being equal to 1 to 30, at a temperature below 0° C. with a Friedel-Crafts catalyst.

8. The process which comprises copolymerizing a reaction mixture consisting of 70 to 99.7% by weight of an aliphatic olefin of 3 to 5 carbon atoms and 0.3 to 30% by weight of a ring-halogenated styrene, the arithmetic product of the per cent of the halostyrene times the number of halogen atoms in the halostyrene molecule being 1 to 30, at a temperature at least as low as −50° C., using a Friedel-Crafts catalyst.

9. The process of preparing synthetic high molecular weight thermoplastic solid substantially saturated oil-soluble resinous products having an average molecular weight of 5000 to 50,000, which comprises copolymerizing a reaction mixture consisting of 70 to 99% by weight of isobutylene and 1 to 30% by weight of a parahalostyrene, in the presence of a lower alkyl halide solvent and a Friedel-Crafts catalyst, at a temperature at least as low as −50° C.

10. Process according to claim 9 in which the halostyrene is parabromostyrene.

11. Process according to claim 9 in which the halostyrene is parachlorstyrene.

12. The process which consists in copolymerizing a reaction mixture consisting of about 85 to 95% by weight of isobutylene and about 5 to 15% by weight of a parahalostyrene, in the presence of methyl chloride as solvent and using liquefied ethylene as internal refrigerant, and a preformed solution of aluminum chloride in methyl chloride as catalyst, at a temperature of about −103° C.

13. A solid copolymer of 100 parts by volume of isobutylene and 10 parts by volume of parachlorstyrene, said copolymer having an average molecular weight of about 14,000.

14. The process which consists in copolymerizing 10 parts by volume of parachlorstyrene with 100 parts by volume of liquid isobutylene in the presence of 500 parts by volume of methyl chloride, at a temperature of −78° C. using as catalyst 100 parts by volume of a solution consisting of methyl chloride containing .08% of aluminum chloride dissolved therein.

WILLIAM C. HOLLYDAY, Jr.
WILLIAM J. SPARKS.

REFERENCES CITED

The following references are of record in the file of this patent:

UNITED STATES PATENTS

| Number | Name | Date |
|---|---|---|
| 2,368,538 | Gleason | Jan. 30, 1945 |
| 2,406,319 | Brooks | Aug. 27, 1946 |

FOREIGN PATENTS

| Number | Country | Date |
|---|---|---|
| 570,596 | Great Britain | July 13, 1945 |